(12) United States Patent
Campbell et al.

(10) Patent No.: US 9,910,278 B1
(45) Date of Patent: Mar. 6, 2018

(54) AUGMENTED REALITY VISUALIZATION DEVICE

(71) Applicant: GoPro, Inc., San Mateo, CA (US)

(72) Inventors: Scott Patrick Campbell, Belmont, CA (US); Leo Baldwin, Seattle, WA (US); Gary Fong, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 3 days.

(21) Appl. No.: 15/253,754

(22) Filed: Aug. 31, 2016

(51) Int. Cl.

| | | |
|---|---|---|
| *G02F 1/03* | (2006.01) | |
| *G02F 1/15* | (2006.01) | |
| *G02F 1/153* | (2006.01) | |
| *G02F 1/01* | (2006.01) | |
| *G09G 3/38* | (2006.01) | |
| *G02B 27/14* | (2006.01) | |
| *G02B 27/01* | (2006.01) | |
| *G02F 1/157* | (2006.01) | |
| *G02F 1/19* | (2006.01) | |
| *G06T 19/00* | (2011.01) | |

(Continued)

(52) U.S. Cl.
CPC ......... *G02B 27/0101* (2013.01); *G02B 27/14* (2013.01); *G02F 1/15* (2013.01); *G02F 1/157* (2013.01); *G02F 1/19* (2013.01); *G06T 19/006* (2013.01); *G09G 3/38* (2013.01); *G02B 27/0093* (2013.01); *G02B 27/10* (2013.01); *G02B 27/144* (2013.01); *G02B 2027/014* (2013.01); *G02B 2027/0118* (2013.01); *G02B 2027/0132* (2013.01)

(58) Field of Classification Search
CPC .............. G02B 27/0093; G02B 27/017; G02B 27/0172; G02B 27/0176; G02B 27/0178; G02B 27/0179; G02B 27/10; G02B 27/14; G02B 27/144; G02B 2027/0132; G02B 2027/0178; G09G 3/346; G09G 3/38; G09G 2340/0407; G02F 1/0018; G02F 1/01; G02F 1/15; G03B 21/00; G03B 21/2066; G03B 21/28
USPC .............. 359/263, 265, 275, 618, 629–631; 345/7–9, 105
See application file for complete search history.

(56) References Cited

U.S. PATENT DOCUMENTS

| | | | |
|---|---|---|---|
| 6,813,085 B2* | 11/2004 | Richards .............. | G02B 27/017 345/8 |
| 7,639,208 B1* | 12/2009 | Ha ..................... | G02B 27/0172 345/204 |
| 9,250,445 B2* | 2/2016 | Tosaya ............... | G02B 27/0172 |

(Continued)

*Primary Examiner* — Loha Ben
(74) *Attorney, Agent, or Firm* — Fenwick & West LLP

(57) ABSTRACT

A visualization device allows a user to be immersed in visual content by projecting the visual content to the user. A projection element is positioned such that visual content projected from the projection element is reflected off of a mirror, which is angled such that the reflected projection is reflected onto a lens doublet. The lens doublet is angled such that the visual content projection reflected onto the lens doublet is partially reflected toward the user. In addition, an electrochromic slab can be controlled to allow configurable amounts of ambient light into the visualization device. If the electrochromic slab is configured such that no ambient light is allowed into the visualization device, the user is only able to see the visual content projected by the display device. The electrochromic slab can also be configured to allow some or all ambient light to travel into the visualization device.

18 Claims, 6 Drawing Sheets

(51) Int. Cl.
  *G02B 27/00* (2006.01)
  *G02B 27/10* (2006.01)

(56) References Cited

U.S. PATENT DOCUMENTS 9,651,784 B2 * 5/2017 Osterhout .......... G06F 3/03545
2017/0180643 A1 * 6/2017 Pixton ................ H04N 5/23245

* cited by examiner

AUGMENTED REALITY VISUALIZATION DEVICE

TECHNICAL FIELD

The disclosure generally relates to the field of augmented reality.

BACKGROUND

Traditionally, visual content (e.g., images (still and video), movies, TV shows, video games) has been displayed on two-dimensional surfaces, such as monitors and projector screens. These methods for displaying image and video content are deficient because they do not fully immerse the viewer in the visual content. For example, the viewer must look directly at the screen to engage with the visual content, and can only see what is being displayed on the screen. Some video games try to emulate an immersive experience by allowing the player to change what is displayed on the screen, thus simulating the ability to look around at different parts of a scene. However, a screen does not provide peripheral cues that allow a user to feel like they are in the visual content being projected.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
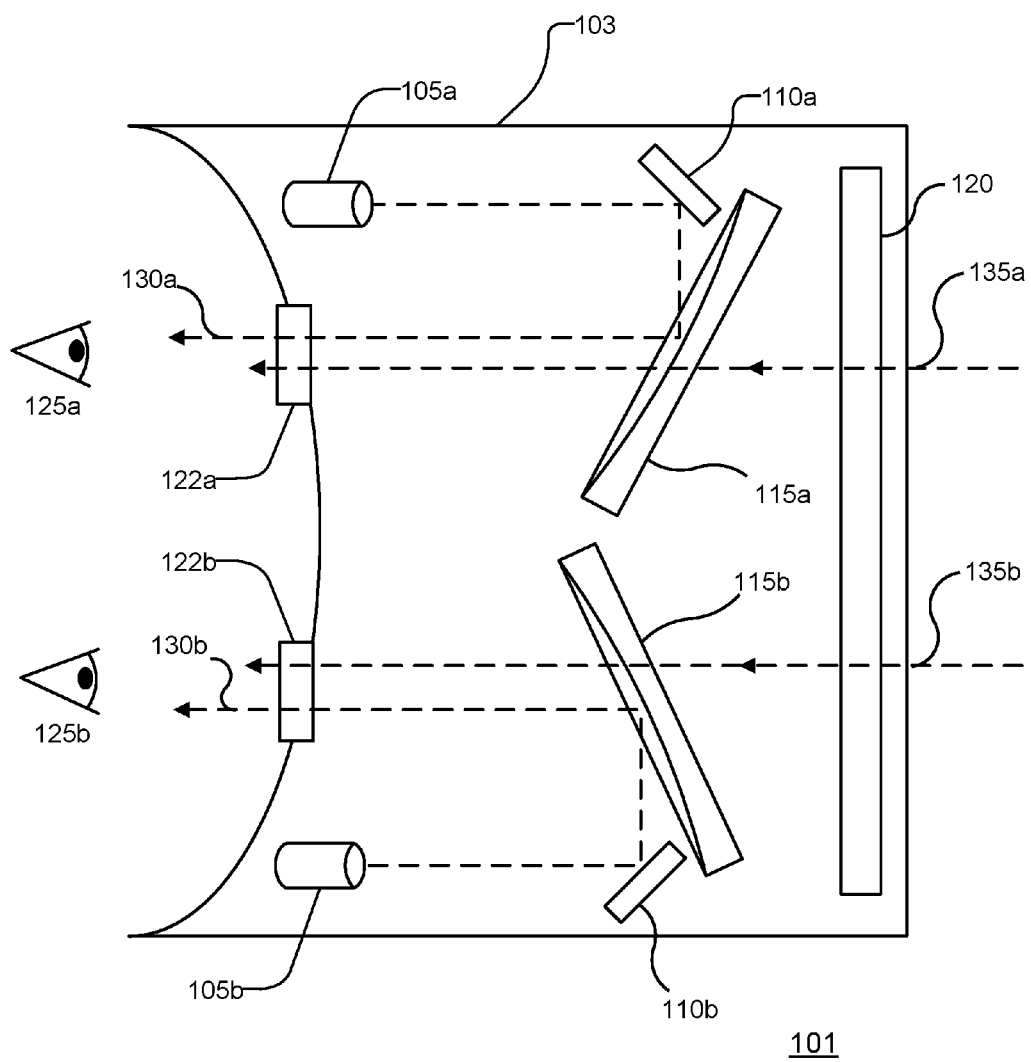
FIG. 1 illustrates the path of travel of a visual content projection and ambient light through the visualization device, in accordance with some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed visualization device for purposes of illustration only. One skilled in the art will readily recognize from the following description that alternative embodiments of the structures and methods illustrated herein may be employed without departing from the principles described herein.

Configuration Overview

A visualization device may be configured to allow a user to be immersed in visual content by projecting the visual content into the eye of the user and changing the projection shown to the user based on where the user is looking. A projection element (e.g. a projector) may be positioned such that visual content projected from the projection element is reflected off of a mirror that is angled such that the reflected projection is reflected onto a lens doublet. A lens doublet 115 is an optical element that includes two lenses: a concave lens and a convex lens. In one example embodiment, the convex lens has a convex side that may be coated with a partially reflective material and the concave lens has a concave side that fits around the convex side. The lens doublet is angled such that the visual content projection reflected onto the lens doublet is partially reflected toward the user's eye. Thus, visual content projected by the projection element can be displayed to the user in an immersive way.

In addition, an electrochromic slab may be positioned at the front of the visualization device such that the user is looking towards the electrochromic slab. The electrochromic slab may be controlled to adjust a transparency level for passage of light, thereby allowing configurable amounts of ambient light into the visualization device. If the electrochromic slab is configured such that no ambient light is allowed into the visualization device, the user is only able to see the visual content projected by the display device, thereby providing an immersive virtual reality experience to the user. The electrochromic slab may also be configured to allow some or all ambient light to travel into the visualization device.

The lens doublet may be positioned within the visualization device such that ambient light passes through the lens doublet with minimal distortion and into the user's eye. Thus, both the image projected by the projection element and ambient light from around the user enter the user's eye, thereby providing an augmented reality experience. The amount of ambient light allowed to enter the visualization device may be configured based on the type of visual content presented to the user, the time of day, and user preferences.

The visualization device may be configured to project the visual content in the direction of the mirror, the lens doublet and the electrochromic slab. Projection of the visual content (e.g., images—still and/or moving) and interaction with these other components provides for an experience an augmented reality experience perceived by the user. By way of example, the electrochromic slab may be configured to allow some or all ambient light to enter the visualization device. This light may be combined with the projection of the visual content from the projection element, via the mirror and lens doublet, and reflected back towards the eyes of a user. The combined image corresponding to the ambient light and the projected images provides the appearance to the user that the environment around the user is overlaid with the visual content being projected. Additionally, the visualization device can project the visual content in such a way that the user perceives a virtual reality experience. For example, the electrochromic slab may be configured to prohibit most or all of the ambient light from entering the visualization, which allows the visual content to be projected to the user without the ambient light. This provides a fully immersive experience in the visual content without interference from ambient light from the surrounding environment.

Projection of Visual Content Through Visualization Device Figure (FIG. 1 illustrates a path of travel of a visual content projection 130 and ambient light 135 through the visualization device 101, in accordance with an example embodiment. FIG. 1 illustrates a visualization device 101 with a device casing 103, two projection elements 105a and 105b (referred to collectively as 105), two mirrors 110a and 110b (referred to collectively as 110), two lens doublets 115a and 115b (referred to collectively as 115), an electrochromic slab 120, and two eyepieces 122a and 122b (referred to collectively as 122). Also illustrated for purposes of perspective are a user's eyes 125a and 125b (referred to collectively as 125), projections 130a and 130b (referred to collectively as 130) of the visual content from respective projections elements 105a and 105b, and paths for ambient light 135a and 135b (referred to collectively as 135). While the ambient light 135 is illustrated in FIG. 1 as travelling in a single direction, the ambient light 135 can be the full field of view of the user through the visualization device and can be entering the visualization device 101 from many angles.

Alternate embodiments may include additional, fewer, or different components, or the components may be positioned differently from the embodiment illustrated in FIG. 1. For example, additional optical components (e.g. mirrors and lenses) may be included to correct distortion that may be caused by the lens doublet, or to configure the projection 130 of the visual content around other equipment in the visualization device 101. Additionally, the components may be positioned differently based on the vision correction needs of a user. Furthermore, FIG. 1 illustrates embodiments with individual, symmetric components for each of the projections 130 of the visual content. In alternate embodiments, each projection 130 may use the same components or may require different components or positioning of components.

Figure 2:
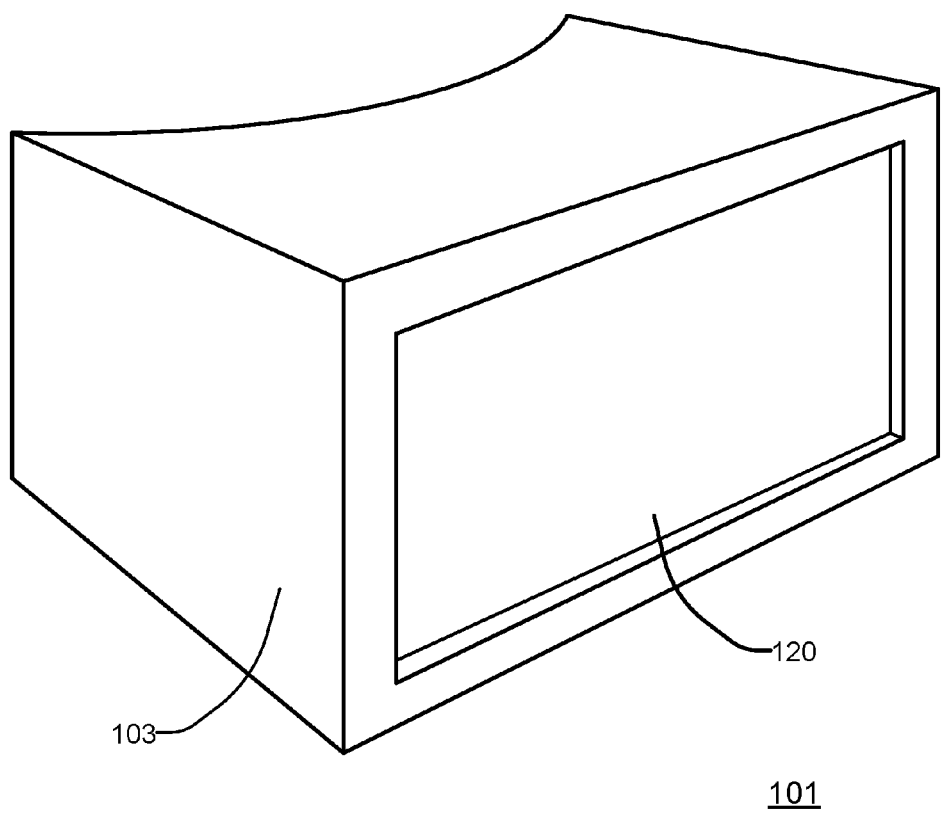
FIG. 2 illustrates an external view of an example device casing of the visualization device, in accordance with some embodiments.

The device casing 103 contains and secures the components of the visualization device 101, and is further illustrated in FIG. 2, which provides a perspective view of an example visualization device, e.g., the visualization device 101. Components of the visualization device 101 may be attached to the device casing 103 using any suitable manner for securing the component in the device casing 103, such as by screws, adhesive, or by fitting the component snuggly into the device casing 103. The device casing 103 can be made of any opaque material, such as metal or polymers, and may fully surround some or all of the components of the visualization device 101 such that no additional light beyond what may be needed, e.g., from its sides, top and/or bottom, can enter the device when the device is in use. In some embodiments, the user looks into the back end of the device casing 103 to use the visualization device 103 and looks towards the front end. In some example embodiments, the back end of the device casing 103 is curved such that a user's forehead would fit comfortably against the device casing 103 while using the visualization device 101. There also may be an opening in the front end of the device casing 103 that is covered by the electrochromic slab 120, as illustrated in FIG. 2. The device casing 103 may be structured with a top side, a bottom side, a left side, and a right side. It is noted that the left side and right side may be defined based on the position of the user eyes with the visualization device.

Referring back to FIG. 1, the projection elements 105 may be any optical source emission device, for example, a projector or a microdisplay. The projection elements 105 may display in high resolution (e.g., 4K or higher resolution) to provide higher quality visual content to the user. The projection elements 105 may be positioned such that the projections 130 the visual content are directed onto the mirrors 110.

The mirrors 110 may be positioned within the visualization device 101 such that the projections 130 of the visual content are reflected onto the lens doublets 115. The mirrors 110 may be made of silvered glass (or glass coated with any other reflective material), and may be flat, parabolic, spherical, aspherically curved, or asymmetrically curved. In some example embodiments, the mirrors 110 may be shaped to counter distortions that may occur in the reflection of the projections 130 of the visual content off of the mirrors 110 or off of the lens doublets 115, or as the projections of the visual content pass through the eyepieces 122. The mirrors 110 may also be shaped to focus the visual content projections 130 such that objects portrayed by the visual content projections 130 appear to be at a correct distance from the user's eyes 125. The mirrors 110 also may be coated with a variably reflective material that can be controlled by a processor, thereby allowing the visualization device 101 to control the brightness of the projection of the visual content 130 to the user. In some embodiments, the mirrors 110 comprise a plurality of mirrors that, in conjunction, reflect the projections 130 of the visual content onto the lens doublets 115.

Example Lens Doublet

Figure 3A:
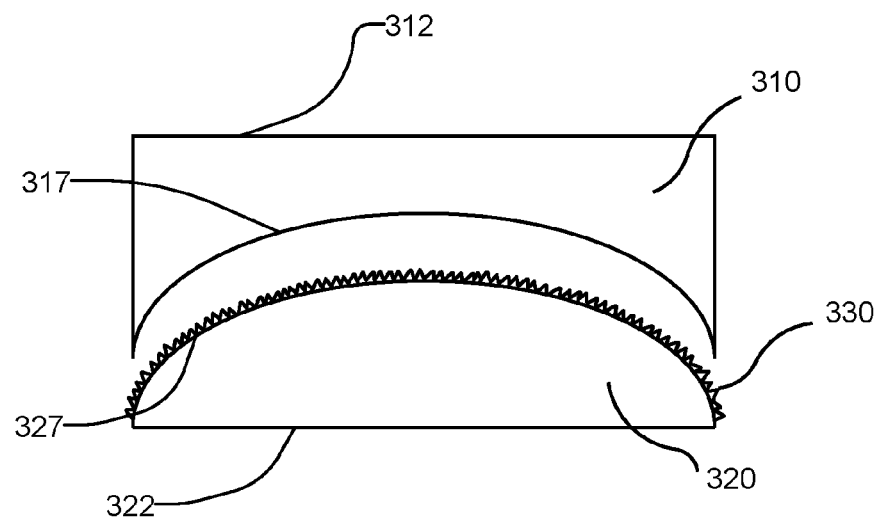
FIGS. 3A and 3B illustrate the components of the lens doublets, in accordance with some embodiments.
Figure 3B:
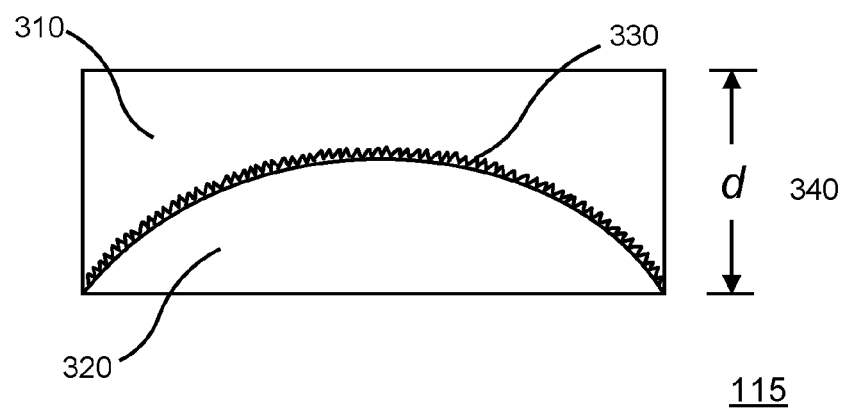

The lens doublets 115 are two or more lenses that may encompass a partially reflective material. The partially reflective material may allow for the projections 130 of the visual content to be reflected into the eyepieces 122 while also allowing ambient light 135 to enter the user's eyes 125. FIGS. 3A and 3B illustrate the components of a lens doublet 115 within the visualization device 101, in accordance with example embodiments.

FIG. 3A illustrates the two lenses that comprise the lens doublets 115: a concave lens 310 and a convex lens 320. The concave lens 310 and the convex lens 320 may be constructed of a transparent material, for example, glass, transparent ceramic, transparent polymers, polycrystalline material, and/or a combination thereof. The concave lens 310 and the convex lens 320 can be constructed of the same material (e.g. to avoid creating optical power) or can be constructed of different materials (e.g. to create optical power to correct for the user's imperfect vision or to counter distortion in other optical elements in the visualization device 101). The concave lens 310 has a flat side 312 and a concave side 317 and the convex lens has a flat side 322 and a convex side 327. The concave side 317 of the concave lens 310 and the convex side 327 of the convex lens 320 are shaped such that the concave side 317 fits closely around the convex side 327 when the lenses are placed together relative to their curvature, for example, as illustrated by FIG. 3B. The concave side 317 and convex side 327 can be spherical, parabolic, aspherically curved, or asymmetrically curved.

The convex side 327 of the convex lens 320 is covered with a partially reflective material 330, for example, a metallic material (e.g. aluminum, silver) and polymers with different indices of refraction from the material making up the rest of the convex lens 320. In some example embodiments, the partially reflective material 330 covers the concave side 317 of the concave lens 310. In some embodiments, the partially reflective material 330 reflects light with a particular polarization and the visual content projection 130 is configured with the particular polarization. For example, the partially reflective material 330 may reflect horizontally polarized light and the visual content projection 130 may be horizontally polarized. The partially reflective material 330 partially reflects the projection 130 of the visual content toward the eyepiece 122 while also allowing ambient light 135 to partially pass through the lens doublet 115 to reach the eyepiece 122. Thus, the viewer can see both the ambient light 135 and the visual content projection 130. In some embodiments, the partially reflective material 330 can be varied in reflectivity based on electrical impulses applied to the partially reflective material 330 (e.g. liquid crystal polymers). The reflectance of the partially reflective material 330 may be adjusted to vary the brightness of the projection 130 of the visual content as displayed to the user. For example, if the reflectance of the variably reflective material is raised, the brightness of the visual content projection is increased as more of the visual content projection is reflected to the eyepieces 122.

When the concave lens 310 and the convex lens 320 are placed together in the configuration shown in FIG. 3B to form the lens doublet 115, the lens doublet 115 forms a single cylindrical lens with flat sides at each end. The flat ends serve to reduce the distortion of the visual content projection 130 and the ambient light 135. In alternate embodiments, rather than having flat ends, the lens doublet is curved (e.g. in the shape of a dome) to reduce the effect of chromatic aberration. In addition, the depth d 340 of the lens doublet 115 may be minimized to reduce the distortion of the visual content projection 130 due to the difference in refractive indices of the lens doublet 115 and the air inside the visualization device 101. In some embodiments, the lens doublet 115 is designed to incorporate optical power which converge or diverge the visual content projection 130 or the ambient light 135. The optical power of the lens doublet 115 may be adjusted based on the visual correction needs of a user.

Referring back to FIG. 1, it was noted that the electrochromic slab 120 may be a piece of electrochromic glass that covers the front of the visualization device 101. In some example embodiments, the electrochromic slab 120 covers an opening in the device casing 103 at the front of the visualization device 101 as illustrated in FIG. 2. The transparency of the electrochromic slab 120 can be adjusted to change the amount of ambient light 135 that enters the visualization device 101. In some example embodiments, the electrochromic slab 120 may be comprised of a smart (or switchable) glass that allows for light transmission properties to be altered based on application of a trigger, for example, a voltage, light, and/or heat. Examples of smart glass technologies may include electrochromic, photochromic, thermochromic, suspended particle, micro-blind and polymer dispersed liquid crystal devices. In alternate embodiments, the electrochromic slab 120 comprises or is replaced by one or more polarizers with an electro-optic wave plate. The electro-optic wave plate adjustably polarize the ambient light 135 and, based on the difference in the polarization angle of the electro-optic wave plate and the one or more polarizers, the amount of ambient light 135 entering the visualization device 101 can be adjusted.

The amount of light that may be permitted to pass through may depend upon an application configuration. For example, the electrochromic slab 120 may be adjusted to allow more ambient light 135 into the visualization device 101 if the visual content relates to the real world around the user (e.g. augmented reality), or may be adjusted to allow less ambient light 135 into the visualization device 101 if the visual content does not relate to the real world (e.g. virtual reality). The electrochromic glass 120 may also be adjusted based on user preferences, the time of day, the type of visual content, or the brightness of the ambient light 135.

The eyepieces 122 direct the visual content projections into the eyes 125 of a user. In some embodiments, the eyepieces 122 are openings in the back of the device casing 103 that the user can look into to see the visual content projections 130. The eyepieces 122 also may include optical equipment that focus or in other ways configure the visual content projections 130 to be presented to the user. In some embodiments, the eyepieces 122 include lenses that adjust the visual content projections 130 to correct for the user's imperfect vision.

Configuration of Optical Components

Figure 4:
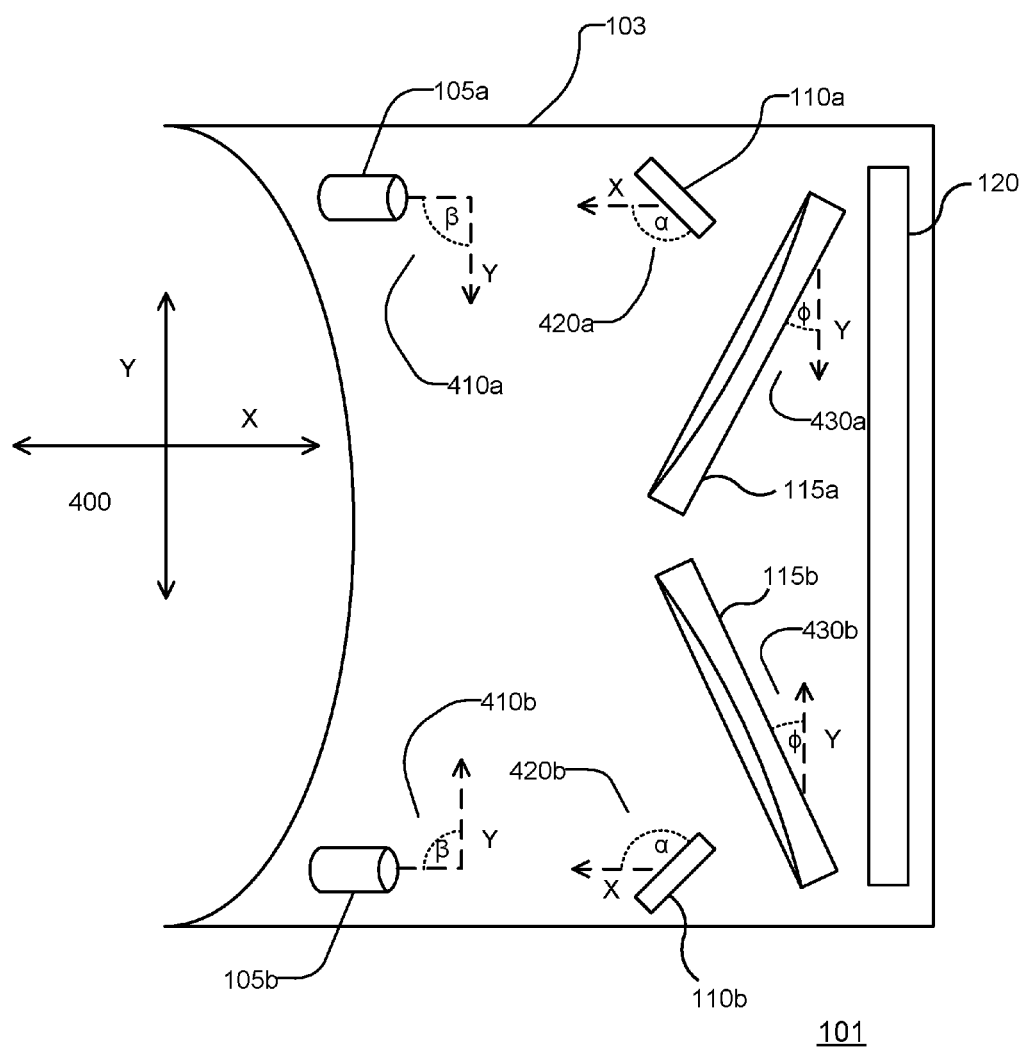
FIG. 4 illustrates the configuration of optical components within the visualization device, in accordance with some embodiments.

FIG. 4 illustrates an example configuration of optical components within the visualization device, in accordance with some embodiments. Alternate embodiments may include additional, fewer, or different components, or the components may be positioned differently from the embodiment illustrated in FIG. 4.

To illustrate the positioning of the components of the visualization device 101, a "top down" view of the visualization device 101 is provide within an X-Y plane 400. It is noted that the X-Y plane 400 (defined by an x-axis and y-axis) is provided for use as a reference for defining angles of the components. As illustrated, the x-axis is the axis orthogonal to the surface of the electrochromic slab 120, and the y-axis is the axis parallel to the surface of the electrochromic slab 120 in the plane of FIG. 4.

The projection elements 105 are positioned at the back of the visualization device 101 and, in some embodiments, are directed at an angle 410 with respect to the y-axis. FIG. 4 illustrates angle 410 as being a right angle, (β, though angle 410 may deviate from exactly 90 degrees. In some embodiments, projection element 105a is directed at an angle 410a (β) and projection element 105b is directed at a different angle 410b (β').

The mirrors 110 are positioned and angled within the visualization device 101 such that the visual content projections 130 from the projection elements 105 are reflected onto the lens doublets 115. In some embodiments, the angle (α) 420 is such that the center of the visual content projection is reflected onto the center of the lens doublets 115. Angle 420 may be wide so that angle 430 can be narrow (described further below). For example, angle (α) 420 may be within the range of 140-180 degrees, though angle (α) 420 is not limited to this range. In some embodiments, mirror 110a is angled at angle 420a (α) with respect to the x-axis, and mirror 110b is angled at a different angle 420b (α') with respect to the x-axis.

The lens doublets 115 are positioned and angled within the visualization device 101 such that the visual content projections 130 are reflected off of lens doublets 115 towards the user's eyes. In some embodiments, the lens doublets 115 are angled at an angle 430 with respect to the y-axis. Angle (ϕ) 430 may be narrow so that ambient light is not too significantly impacted by the lens doublets 115. For example, angle (ϕ) 430 may be within the range of 10-35 degrees, though angle (ϕ) 430 is not limited to this range. In some embodiments, lens doublet 115a is angled at an angle 420a (ϕ) with respect to the y-axis, and lens doublet 115b is angled at an angle 430b (ϕ') with respect to the y-axis.

Additional Hardware Configuration

Figure 5:
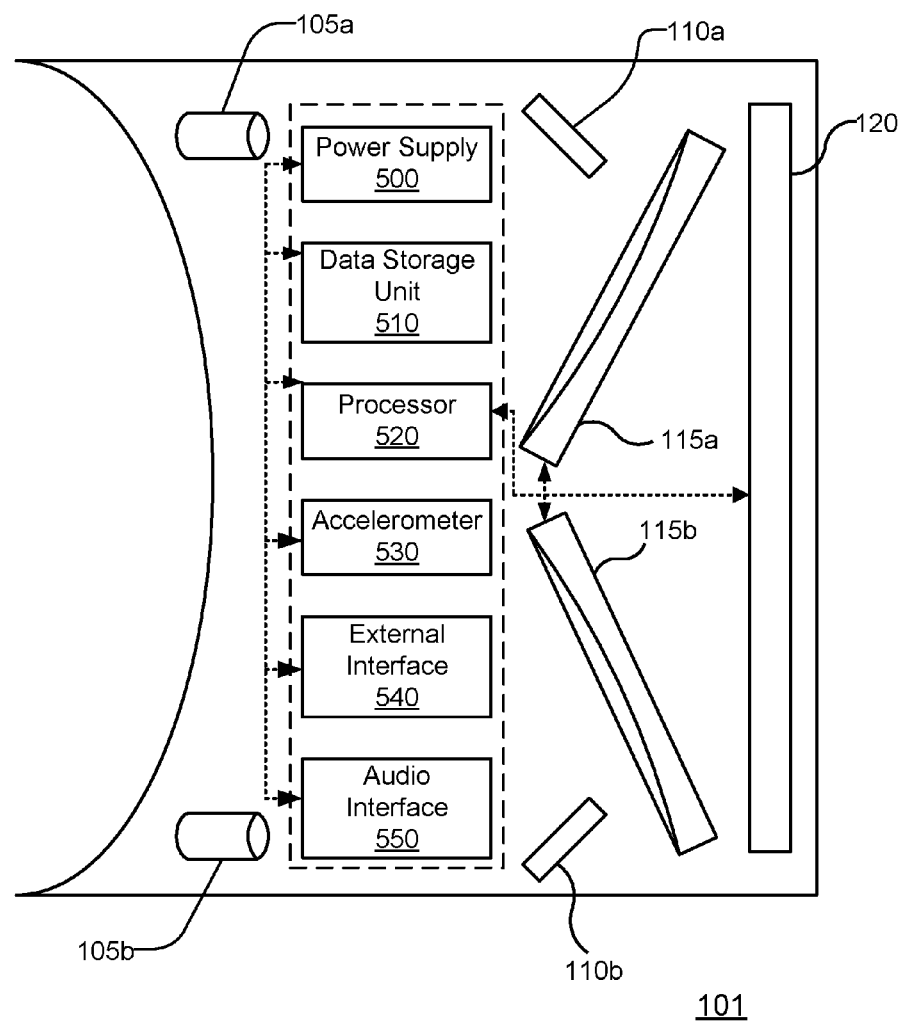
FIG. 5 illustrates electronic hardware components within the visualization device, in accordance with some embodiments.

FIG. 5 illustrates example hardware components within the visualization device, in accordance with some example embodiments. FIG. 5 illustrates a power supply 500, a memory unit 510, an accelerometer 520, a processor 530, an external interface 540, and an audio interface 550. Alternate embodiments may include additional, fewer, or different components than those illustrated in FIG. 5. In addition, whereas FIG. 5 illustrates hardware components within the visualization device, these components could also be external to the visualization device in a separate casing that is communicatively connected to the visualization device.

The power supply 500 may be structured to supply power to the hardware components of the visualization device 101. The power supply 500 also may provide power to the projection elements 105 to project the visual content to the user. The power supply 500 may store power is stored on the visualization device 101 itself (e.g. a battery), or may be coupled with the external interface 540 to receive power from an external source (e.g. a power outlet). In some embodiments, the power supply 500 may receive power from the external interface 540 to power the hardware in the visualization device and to charge a batter stored by the power supply 500.

The data storage unit 510 may include any combination of short-term and long-term data storage, such as dynamic memory, static memory, and non-volatile flash memory. The data storage unit 510 may store visual content to be displayed through the visualization device 101, such as images, movies, video game content, and applications. The data storage unit 510 also may include a computer readable medium on which is stored instructions for the processor 520. The instructions stored in the data storage unit 510 may include instructions for operating the projection elements 105 or the electrochromic slab 120. In some embodiments, the instructions stored in the data storage unit 510 can configure the visual content projections 130 based on the vision correction needs of the user. The instructions also may operate variably reflective material on the mirrors 110 or on the lens doublets 115.

In some embodiments, the data storage unit 510 may store instructions for determining how to operate the electrochromic slab 120 or variably reflective material on the lens doublets 115 to produce a desired ratio of virtual reality to augmented reality. For example, if the visualization device is displaying a movie to the user, the visualization device may prevent the user from viewing the ambient light so that the user is not distracted from the displayed visual content. Thus, the ratio of virtual reality to augmented reality is high. However, the visualization device may present visual content that may be dependent on the user's surrounding, in which case the visualization device may allow the user to see more ambient light so that the visual content can be presented on top of the ambient light. Thus, the ratio of virtual reality to augmented reality is low. The data storage unit 510 may store instructions to be executed by the processor 520 for configuring the electrochromic slab 120 or variably reflective material on the lens doublet 115 to produce the desired blend of visual content and ambient light. In some embodiments, the instructions implement an equation for determining the configuration of the electrochromic slab 120 or the variably reflective material on the lens doublets 115 to achieve a desired ratio of virtual reality to augmented reality. Also, the instructions may be dependent on the strength of the ambient light. For example, if the ambient light is bright, the instructions may configure the electrochromic slab 120 to be more opaque than if the ambient light is dim. The instructions for configuring the ratio of virtual reality to augmented reality may configure the electrochromic slab 120 or variably reflective material on the lens doublets 115 based on the type of the video content being projected, the time of day, the brightness of the ambient light 135, and user preferences.

The processor 520 is a processing unit capable of executing instructions stored in the data storage unit 510. The processor 520 can be a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor 520 also may be configured to communicate with the accelerometer 530, the external interface 540, the audio interface 550, or other entities external to the visualization device 101. In some embodiments, the processor is capable of transmitting visual content stored in the data storage unit 510 to the projection elements 105. The processor 520 also may be configured to apply electrical impulses to the electrochromic slab 120 (or controller coupled with the slab 120) to adjust the transparency of the electrochromic slab 120 or the reflectance of the partially reflective material in the lens doublets 115.

The accelerometer 530 measures the acceleration of the visualization device 101 as while the user is operating the visualization device 101. The accelerometer 530 may be configured to transmit acceleration data to the processor 520 to determine the direction in which the user is looking and the processor 520 may configure the visual content based on where the user is looking. For example, if the user is playing a video game using the visualization device 101, the processor 520 may change the portion of the scene that is being displayed to the user based on the acceleration data from the accelerometer 530.

The external interface 540 may allow the visualization device 101 to communicate with other devices and entities. For example, the external interface 540 may receive visual content from another device to be displayed in the visualization device 101. The external interface 540 may include wired or wireless connection capabilities. In some embodiments, the external interface 540 includes a network interface that allows the visualization device 101 to communicate with other devices over a network.

The audio interface 550 may output audio to the user in conjunction with visual content. For example, if the user is watching a movie using the visualization device 101, the audio interface 550 may output the audio associated with the movie to the user. Audio content may be stored in the data storage unit 510 and may be delivered to the audio interface 550 by the processor 520.

Additional hardware components that may be included in the visualization device includes a geo-location module for determining the geographic position of the visualization device (e.g. through GPS), an electronic compass for determining the direction the visualization device is directed, a light sensor for detecting the strength of ambient light, and an audio input interface (e.g. a microphone) for receiving voice commands.

Adjusting Ratio of Virtual Reality to Augmented Reality

Figure 6:
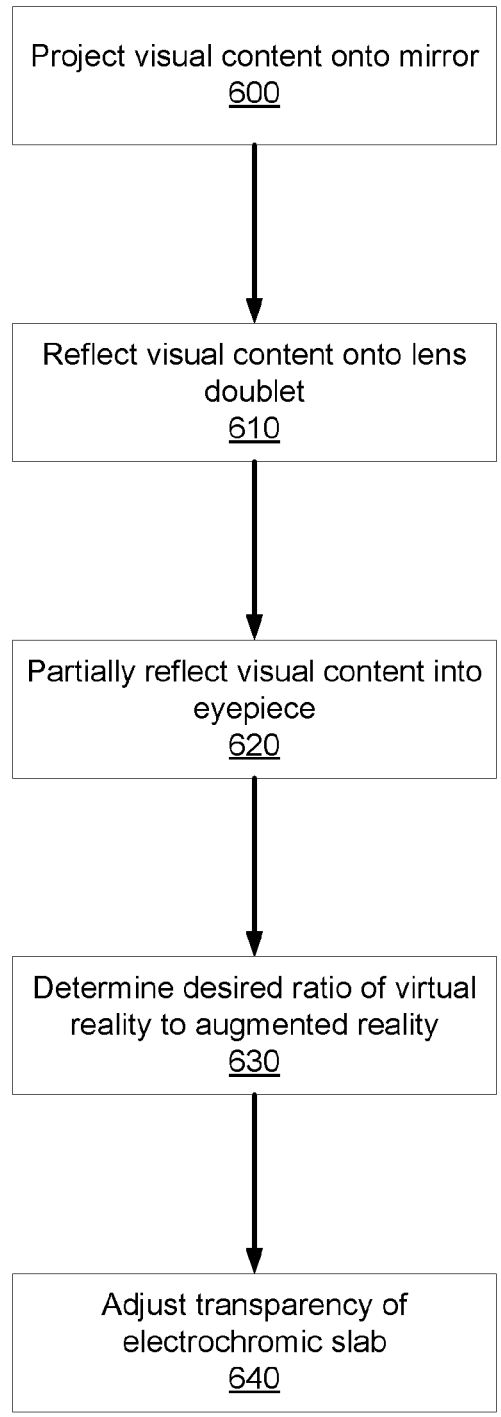
FIG. 6 is a flowchart for a method for adjusting the ratio of virtual reality to augmented reality in a visualization device, in accordance with some embodiments.

FIG. 6 is a flowchart for a method for adjusting the ratio of virtual reality to augmented reality in a visualization device, in accordance with some embodiments. Alternate embodiments may include more, fewer, or different steps from the ones described in FIG. 6, and the steps may be performed in an order different from the order presented in FIG. 6.

The projection elements 105 in the visualization device project 600 visual content onto the mirrors 110. The projection elements 105 may project visual content stored in the data storage unit 510 and delivered to the projection elements 105 by the processor. The project elements may be positioned at a predefined angle 410 (e.g. orthogonal) with respect to the electrochromic slab 120.

The mirrors 110 are positioned within the visualization device such that the visual content is reflected 610 onto the lens doublet. The mirrors 110 may be positioned within the visualization device at an angle 420 with respect to the electrochromic slab 120. In some embodiments, the angle 420 at which the mirrors 110 are positioned is a wide angle (e.g., 140-180 degrees) so that the lens doublets 115 can be positioned at a narrow angle 430 with respect to the electrochromic slab 120.

The lens doublets 115 partially reflect 620 the visual content into the eyepieces 122. The lens doublets 115 may be positioned within the visualization device at an angle 430 with respect to the electrochromic slab 120. In some embodiments, the angle 430 at which the lens doublets are positioned is a narrow angle (e.g., 10-30 degrees) to minimize distortion to ambient light entering the visualization device.

The visualization device determines 630 the desired ratio of virtual reality to augmented reality for the visual content. The ratio of virtual reality to augmented reality represents the degree to which the viewer can view the real world around them while being presented the visual content. The ratio of virtual reality to augmented reality may be determined based on the time of day, the brightness of the ambient light, and user preferences. The ratio of virtual reality to augmented reality may be determined by the processor 520 based on instructions stored in the data storage unit 510. For example, the data storage unit 510 may store instructions that cause the processor 520 to implement algorithms for determining the ratio of virtual reality to augmented reality based on user preferences stored in the data storage unit 510 and the type of the visual content being projected.

In some embodiments, the desired ratio of virtual reality to augmented reality is determined based on a ratio of the intensity of visual content projection to the intensity of the ambient light. To determine the ratio of the intensities of the visual content projection and the ambient light, the visualization device must determine the intensities of the visual content projection and the ambient light as each enters the user's eyes. In some embodiments, the intensity of the visual content projection as it enters the user's eyes $I_v$ can be expressed as:

$$I_v = R_m R_d I_{v_0}$$

where $I_{v_0}$ is the initial intensity of the visual content projection as it leaves the projection element, $R_m$ is the reflectance of the mirror, and $R_d$ is the reflectance of the lens doublet. In some embodiments, the intensity of the ambient light as it enters the user's eyes $I_a$ can be expressed as:

$$I_a = t_s t_d I_{a_0}$$

where $I_{a_0}$ is the initial intensity of the ambient light, $t_s$ is the transparency of the electrochromic slab, and $t_d$ is the transparency of the lens doublet. The initial intensity of the ambient light may be measured by a light sensor on the outside of the visualization device.

The transparency of the electrochromic slab 120 may be adjusted 640 by the processor 520 to achieve the desired ratio of virtual reality to augmented reality. In some embodiments, the visualization device will adjust the transparency of the electrochromic slab 120 based on the visual content being displayed to the user. For example, if the visual content is a movie, the visualization device may increase the ratio of virtual reality to augmented reality, thereby decreasing the transparency of the electrochromic slab 120 and preventing ambient light from entering the visualization device. However, if the visual content is an application that interacts with the real world around the user, the visualization device may decrease the ratio of virtual reality to augmented reality, and increase the transparency of the electrochromic slab 120 to allow ambient light to enter the visualization device.

Additional Considerations

The visualization device described herein provides visual content to a user in an immersive manner, thereby improving the quality of the user's experience with the visual content. Furthermore, the visualization device can adjust the ratio of virtual reality to augmented reality, which provides numerous benefits. For example, a user does not need more than one device for virtual reality and augmented reality, and the ratio can be adjusted dynamically based on changing ambient light conditions, visual content, and user preferences. Thus, a user's experience with the visual content can be consistent in a dark room and outdoors.

Throughout this specification, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment," "some embodiments," or "various embodiments" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for an augmented reality or other visualization device as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement and details of the apparatus disclosed herein without departing from the spirit and scope defined in the appended claims.

What is claimed is:

1. A visualization device comprising:
   a device casing having front side, a back side, and a first side and a second side, the back side structured with a first eyepiece positioned toward the first side and a second eyepiece positioned toward the second side;
   an electrochromic slab structured on the front side of the device and configured to adjust a transparency level for passage of light;
   a first lens doublet structured towards the front side of the device casing at a first doublet angle with respect to the electrochromic slab, and a second lens doublet structured towards the front side of the device casing at a second doublet angle with respect to the electrochromic slab, each the lens doublet comprising:
- a convex lens comprising a convex side that is coated with a partially reflective material, and
- a concave lens comprising a concave side that rests around the convex side of the convex lens;

a first projection element structured towards the back side of the device casing along the first side of the device casing and a second projection element structured towards the back side of the device casing along the second side of the device casing;

a first mirror structured a first side of the device casing between the first projection element and the first lens doublet, and a second mirror structured the second side of the device casing between the second projection element and the second lens doublet, the first mirror positioned to reflect visual content from the first projection element onto the convex lens of the first lens doublet for reflection of the image off of the partially reflective material towards the first eyepiece, and the second mirror positioned to reflect visual content from the second projection element onto the convex lens of the second lens doublet for reflection of the image off of the partially reflective material towards the second eyepiece.

2. The visualization device of claim 1, wherein the first doublet angle and the second doublet angle are between 10 degrees and 30 degrees.

3. The visualization device of claim 1, wherein the first mirror and the second mirror are each positioned at an angle with respect to an axis orthogonal to the electrochromic slab, the angles being between 140 degrees and 180 degrees.

4. The visualization device of claim 1, wherein the first projection element and the second projection element are each positioned substantially orthogonally to the electrochromic slab.

5. The visualization device of claim 1, wherein the partially reflective material can vary in reflectivity in response to electrical impulses.

6. The visualization device of claim 1, wherein the mirror is coated with a partially reflective material that can vary in reflectivity in response to electrical impulses.

7. The visualization device of claim 1, further comprising a processor and a data storage unit, the processor being communicatively coupled with the data storage unit to receive instructions from the data storage unit.

8. The visualization device of claim 7, wherein the data storage unit contains visual content to be displayed on the visualization device.

9. The visualization device of claim 7, wherein the data storage unit contains instructions for adjusting the transparency of the electrochromic slab to achieve a desired ratio of virtual reality to augmented reality.

10. The visualization device of claim 7, further comprising an accelerometer communicatively coupled to the processor.

11. The visualization device of claim 1, wherein the convex sides of the convex lenses and the concave sides of the concave lenses are one of parabolic, spherical, aspherically curved, or asymmetrically curved.

12. The visualization device of claim 1, wherein the first mirror and the second mirror are one of parabolic, spherical, aspherically curved, or asymmetrically curved.

13. The visualization device of claim 1, wherein the first mirror is positioned to reflect a center of the visual content from the first projection element onto a center of the first lens doublet and the second mirror is positioned to reflect a center of the visual content from the second projection element onto a center of the second lens doublet.

14. A method for displaying visual content in a visualization device, the method comprising:
- projecting, by a projection element in the visualization device, a first visual content onto a mirror in the visualization device;
- reflecting the first visual content by the mirror onto a lens doublet in the visualization device, the lens doublet comprising (i) a convex lens comprising a convex side that is coated with a partially reflective material, and (ii) a concave lens comprising a concave side that rests around the convex side of the convex lens;
- partially reflecting, by the lens doublet, the first visual content into an eyepiece;
- determining a first desired ratio of virtual reality to augmented reality based on the first visual content;
- adjusting a transparency of an electrochromic slab to achieve the first desired ratio;
- projecting, by the projection element, a second visual content onto the mirror, the second visual content replacing the first visual content;
- reflecting the second visual content by the mirror onto the lens doublet;
- partially reflecting the second visual content into the eyepiece;
- determining a second desired ratio of virtual reality to augmented reality based on the second visual content, the second desired ratio being different from the first desired ratio; and
- adjusting the transparency of the electrochromic slab to achieve the second desired ratio.

15. The method of claim 14, wherein the first desired ratio and the second desired ratio are determined based on at least one of: a time of day, a brightness of ambient light outside of the visualization device, and user preferences.

16. The method of claim 14, wherein a reflectance of the partially reflective material coating the convex side of the convex lens can be varied with electrical impulses, and further comprising:
- adjusting the reflectance of the partially reflective material to achieve the first desired ratio and the second desired ratio.

17. The method of claim 14, wherein the mirror is coated with a partially reflective material that can be varied with electrical impulses, and further comprising:
- adjusting the reflectance of the partially reflective material on the mirror to achieve the first desired ratio and the second desired ratio.

18. The method of claim 14, wherein adjusting the transparency of the electrochromic slab to achieve the first desired ratio and the second desired ratio comprises applying electrical impulses to the electrochromic slab to adjust the transparency of the electrochromic slab.

* * * * *